United States Patent Office 3,796,684
Patented Mar. 12, 1974

3,796,684
POLYMER COMPOSITIONS STABILIZED WITH SUBSTITUTED 4,5 - BENZO-1,3,2-DIOXAPHOSPHOLANES
James L. Dever, Lewiston, and James J. Hodan, Williamsville, N.Y., assignors to Borg-Warner Corporation, Chicago, Ill.
No Drawing. Original application Aug. 31, 1967, Ser. No. 664,603, now Patent No. 3,632,690. Divided and this application May 24, 1971, Ser. No. 146,502
Int. Cl. C08f 45/58
U.S. Cl. 260—45.8 R    1 Claim

ABSTRACT OF THE DISCLOSURE

This invention is directed to a composition comprising a polymer and a novel stabilizer of the formula:

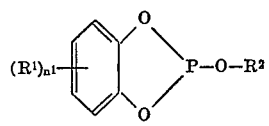

in which $R^2$ is selected from the group consisting of aryl and substituted aryl, $R^1$ is selected from the group consisting of alkyl, substituted alkyl, aryl and substituted aryl, and $n^1$ is from 0 to 4. Where $n^1$ is more than 1, the substituents $R^1$ may be the same or different. Polymers stabilized in the practice of this invention include polyethylene, polypropylene, acrylonitrile-butadiene-styrene copolymers and polystyrene.

CROSS REFERENCE TO RELATED APPLICATION

This application is a division of application Ser. No. 664,603, filed Aug. 31, 1967, now U.S. Pat. No. 3,632,690.

BACKGROUND

In recent years, major advances have been made in the efficient production of hydroxyphenols and substituted hydroxyphenols. Accordingly, there is a continuing search for novel and useful compounds that can be prepared from hydroxyphenols Prior art patents and other references such as U.S. Pat. 2,744,128 require the presence of an HCl acceptor, in order to produce tertiary phosphites. Also, see U.S. Pat. 3,172,871. The following literature references should serve to illustrate this point, and serve to illustrate the normally expected reactions.

(1) Two moles of an alcohol may be reacted with $PCl_3$ to produce the phosphorochloridite:

$$2ROH + PCl_3 \rightarrow (RO)_2PCl + 2HCl$$

Ref.: W. Gerrard, J. Chem. Soc., 1944, 85.

However, if this intermediate is then reacted with a third mole of alcohol in the absence of an HCl acceptor, one obtains the secondary phosphite (pentavalent) rather than the tertiary phosphite (trivalent):

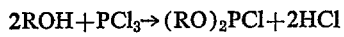

Ref.: U.S. Pat. 2,864,847.

(2) It may be further stated that the reaction of $PCl_3$ with three moles of alcohol produces the secondary rather than the tertiary phosphite:

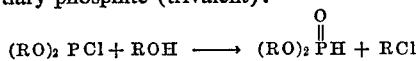

Ref.:
(a) T. Milobendski and A. Sachnowski, Chem. Polski, 15 34 (1917);

(b) British Pat. 778,077 (1954); and
(c) H. McCombre et al., J. Chem. Soc., 1945, 380.

For U.S. Pat. 3,172,871, particularly column 2, lines 32–34 and column 6, line 28, although there is no mention of an acid acceptor, columns 7 and 8 of the patent give experimental conditions used to prepare the compounds of this patent and in all cases a hydrogen chloride acceptor, i.e., triethylamine, was employed. Additionally, column 8, lines 18–21 indicate that a hydrogen chloride acceptor was used in all cases for the preparation of the compounds cited. It may be further stated that the failure to use an acid acceptor would have led to products other than those indicated in the patent. This is substantiated by the references previously cited.

Trivalent phosphorus esters of O-hydroxyphenol are desirable because of their outstanding thermal and hydrolytic stability.

Accordingly, an object of this invention is a novel process for producing a phosphorus aromatic ester of O-hydroxyphenol.

Another object is a novel ester of O-hydroxyphenol, typically characterized by good thermal and hydrolytic stability.

Other objects become apparent from the preceding and following disclosure.

THE INVENTION

The objects of this invention are obtained by a novel process for producing a compound, comprising heating a phenolic to from about 50° C. to about 250° C., preferably about 130° C. to about 180° C. and promptly thereafter adding, in the substantial absence of an acid acceptor (i.e., a hydrogen halide, acceptor), about an equimolar amount of typically 4,5-benzo-2-halo-1,3-dioxa-2-phospholane, or a substituted form thereof, while maintaining the temperature in the above-identified range. At temperatures above about 180° C., a higher degree of degradation occurs in direct proportion to increase in temperature. When a phenolic reactant having a relatively low boiling point is employed, a lower reaction temperature should be employed. After addition of the phospholane, in this process, the reaction temperature is preferably maintained until reaction is substantially complete as evidenced by cessation of the evolution of hydrogen chloride. After an appropriate reaction period of about 1 to about 10 hours, preferably about 2 to about 3 hours, the mixture consists of essentially pure novel compound of this invention. If higher purity is required the reaction product may be distilled under vacuum. This process is advantageous in that it does not require the use of a base, requires no refrigeration, uses about equimolar amounts of reactants, and proceeds in high conversions. In the novel process of this invention, it is critical that the reaction be carried out in the substantial absence of an acid acceptor.

The novel process described above may employ any phospholane of the formula:

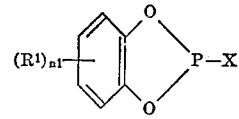

is reacted with a phenolic compound of the formula $R^2$—OH, preferably a phenol or substituted phenol of the formula:

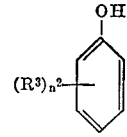

whereby the novel phosphorus aromatic ester is produced of the formula:

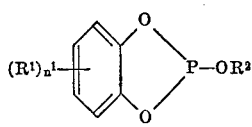

in which X is a halogen, preferably selected from the group consisting of chlorine, bromine and iodine, in which $R^2$ is selected from the group consisting of aryl, and substituted aryl, in which $R^1$ and $R^3$ are each selected from the group consisting of alkyl, substituted alkyl, aryl, and substituted aryl, for example, and in which $n^1$ and $n^2$ are each from 0 to 4. Where $n^1$ or where $n^2$ either are more than 1, the multiple substituents may be either the same or different. A compound of this general type is highly suitable for use as an intermediate in the synthesis of more complicated compounds.

The above compounds of the resulting formula are effective stabilizers for polymer such as polypropylene, polyethylene, acrylonitrile butadiene-styrene copolymer, polystyrene, and other like compounds.

The alkyl substituent for $R^1$ and $R^3$ values may be any conventional aryl or conventional alkyl of 1 to 12 carbon atoms such as methyl, ethyl, propyl butyl, pentyl, hexyl, decyl, dodecyl, and the like; preferably lower alkyl.

Typical aryls referred to above include phenyls, substituted phenyl, polycyclic phenyls, naphthyls, substituted forms thereof, and the like.

Typical compounds representative of the compounds of the above generic formula produced by the process of this invention typically include: 2-phenoxy-4,5-benzo-1,3,2-doxa-phospholane; 2-(nonylphenoxy)-4,5-benzo-1,3,2-dioxa-phospholane; 2-(p-t-butylphenoxy)-4,5-benzo-1,3,2-dioxa phospholane; 2-(2,6-di-isopropylphenoxy)-4,5-benzo-1,3,2-dioxa-phospholane; 2,(2,4 - di - t-butylphenoxy)-4,5-benzo-1,3,2-dioxa-phospholane; 2-(2,6-dimethylphenoxy)-4,5-benzo-1,3,2-dioxa-phospholane; 2 - [(1 - phenylethyl)phenoxy]-4,5-benzo - 1,3,2 - dioxa - phospholane; 2-(2,6-di-sec-butylphenoxy)-4,5-benzo - 1,3,2 - dioxa - phospholane; 2-(2,4-di-sec-alkylphenoxy-4,5-benzo-1, oxa phospholane; and 2-(octylphenoxy)-4,5-benzo-1,3,2-dioxa-phospholane; 2 - (3,5 - di - t-butylphenoxy)-4,5-benzo-1,3,2-dioxa-phospholane, and the like.

The following examples are intended to illustrate the invention and do not limit the invention except to the extent that the appended claims are limited or as otherwise stated. In the following examples, all percentages are by weight, and temperatures are expressed in degrees centigrade unless otherwise stated.

The following Examples I-X illustrate the use of these compounds as stabilizers for polypropylene. This data was obtained using a Brabender Plasticorder which is widely accepted in the plastics industry as a laboratory duplication of plastics plant processing. This instrument graphs changes in torque of a polymer melt with time under processing conditions. The torque is directly related to the viscosity of the polymer melt. Changes in viscosity have long been used as an indication of degradation of polymers. When degradation occurs by cross-linking the viscosity and torque increase with degradation and when degradation occurs by chain breaking, the viscosity and torque decrease with degradation. In the case of polypropylene, which was evaluated in this particular case, the torque decreases with degradation as evidenced by the values indicated in the attached table of results where no stabilizer was added. Initially, the torque was 760 metergrams and after fifteen minutes had dropped to 105 m.-g. All the readings in the table are 15 minute readings because they offered the most convenient comparison point with unstabilized polypropylene. All values in the table were obtained using an EH 6 measuring head with mixing set at 100 r.p.m. and a bowl temperature of 190° C. The stabilizer was added at a 1% load level to unstabilized polypropylene and the mixture pre-blended before introduction to the mixing bowl. See Table I below.

TABLE I
Stabilization of polypropylene with—

| Example number: | Value of R | 15 minute torque reading (meter-g.) |
|---|---|---|
| I | No stabilizer | 105 |
| II | —C₆H₄—CH(CH₃)C₆H₅ | 580 |
| III | CH₃CHC₂H₅—C₆H₄—CH₃CHC₂H₅ | 755 |
| IV | —C₆H₄—C₉H₁₉ | 850 |
| V | —C₆H₄—C(CH₃)₃ | 630 |
| VI | CH(CH₃)₂—C₆H₄—CH(CH₃)₂ | 800 |
| VII | —C₆H₅ | 540 |
| VIII | C(CH₃)₃—C₆H₄—C(CH₃)₃ | 770 |
| IX | CH₃—C₆H₄—CH₃ | 510 |
| X | CH(CH₃)₂—C₆H₄—CH(CH₃)₂ | 770 |

Examples XI through XIX illustrate the preparation of novel compounds by the novel process of this invention.

EXAMPLE XI 4,5-benzo-2-phenoxy-1,3,2-dioxaphospholane

A 500 ml. flask was charged with 94.1 g. (1.0 mole) of phenol which was heated to 155° C. under $N_2$. Then 174.5 g. (1.0 mole) of 4,5-benzo-2-chloro-1,3,2-dioxaphospholane was added dropwise in 0.1 hour at 150–160° C. When addition was over the mixture was heated 0.5 hour at 180° C., cooled under vacuum and distilled to give 208.9 g. (30% conversion) of clear, colorless product B.P. 85–86°, about 0.18 mm., $N_D^{25}$ 1.5771.

EXAMPLE XII 2-(2,4-di-sec-butylphenoxy)-4,5-benzo-1,3,2-dioxaphospholane

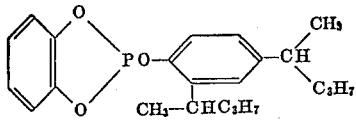

A 500 ml. flask was charged with 164.1 g. (0.7 mole) of 2,4-di-sec-amylphenol. This was heated to 155° C. under nitrogen and then 121.2 g. (0.7 mole) of 4,5-benzo-2-chloro-1,3,2-dioxaphospholane was added dropwise in 0.35 hour at 155–160° C. After heating one hour at 160°, the mixture was cooled under vacuum and distilled to give 241.8 g. (93% conversion) of clear, colorless product, B.P. 141–144° C., about 0.1 mm., having the following analysis:

*Analysis.*—Calc'd for $C_{22}H_{29}O_3P$ (percent): C, 71.0; H, 7.8; P, 8.3. Found (percent): C, 70.9; H, 8.0; P, 8.2.

EXAMPLE XIII 2-(1-phenylethyl phenoxy)-4,5-benzo-1,3,2-dioxaphospholane

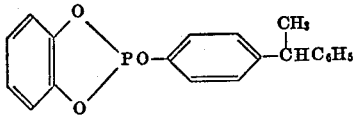

A 500 ml. flask was charged with 158.6 g. (0.8 mole) of monostyrenated phenol. This was heated to 153° C. under $N_2$ and then 139.6 g. (0.8 mole) of 4,5-benzo-2-chloro-1,3,2-dioxaphospholane was added dropwise in 0.5 hour at 155–160°. After heating an additional hour at 160°, the mixture was cooled under vacuum and distilled to give 233 g. (87% conversion) of clear, colorless product B.P. 157–164° C., about 0.1 mm., having the following analysis:

*Analysis.*—Calc'd for $C_{20}H_{17}O_3P$ (percent): C, 71.4; H, 5.1; P, 9.2. Found (percent): C, 71.5; H, 5.2; P, 9.2.

EXAMPLE XIV 2-(2,6-di-iso-propylphenoxy)-4,5-benzo-1,3,2-dioxaphospholane

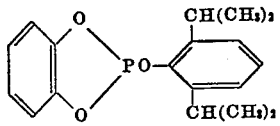

A 500 ml. flask was charged with 142.6 g. (0.8 mole) of 2,6-di-iso-propylphenol. This was heated to 155° C. under $N_2$ and 139.6 g. (0.8 mole) of 4,5-benzo-2-chloro-1,3,2-dioxaphospholane was added dropwise in 0.7 hour at 155–160° C. After heating an additional hour at 160° C., the mixture was cooled under vacuum and distilled to give 231.2 g. (91% conversion) of clear, colorless product, B.P. 118–121° C., about 0.2 mm., having the following analysis:

*Analysis.*—Calc'd for $C_{18}H_{31}O_2P$ (percent): C, 68.4; H, 6.7; P, 9.8. Found (percent): C, 68.3; H, 6.7; P, 9.8.

EXAMPLE XV 2-(2,6-di-sec-butylphenoxy)-4,5-benzo-1,3,2-dioxaphospholane

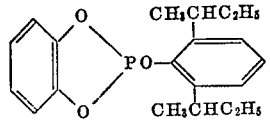

A 500 ml. flask was charged with 153.2 g. (0.75 mole) of 2,6-di-sec-butylphenol. This was heated to 155° C. under $N_2$ and then 130.9 g. (0.75 mole) of 4,5-benzo-2-chloro-1,3,2-dioxaphospholane was added dropwise in 0.4 hour at 150–160° C. After heating an additional hour at 160° C., the mixture was cooled under vacuum and distilled to give 238.6 g. (93% conversion) of clear, colorless product, B.P. 131–133° C., about 0.18 mm., having the following analysis:

*Analysis.*—Calc'd for $C_{20}H_{23}O_3P$ (percent): C, 70.1; H, 6.8; P, 9.0. Found (percent): C, 70.0; H, 6.9; P, 9.1.

EXAMPLE XVI 2-(3,5-di-t-butylphenoxy)-4,5-benzo-1,3,2-dioxaphospholane

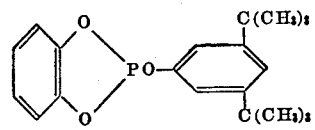

A 500 ml. flask was charged with 92.8 g. (0.45 mole) of 3,5-di-t-butylphenol. This was heated to 155° C. under $N_2$ and then 78.5 g. (0.45 mole) of 4,5-benzo-2-chloro-1,3,2-dioxaphospholane was added dropwise in 0.7 hour at 155–160° C. After heating one hour at 160° C., the mixture was cooled under vacuum and the residue distilled to give 139.1 g. (90% conversion) of clear, colorless product, B.P. 129–130° C., about 0.15 mm. having the following analysis.

*Analysis.*—Calc'd for $C_{20}H_{25}O_3P$ (percent): C, 69.8; H, 7.3; P, 9.0. Found (percent): C, 69.8; H, 7.3; P, 9.1.

EXAMPLE XVII 2-(2,6-dimethylphenoxy)-4,5-benzo-1,3,2-dioxaphospholane

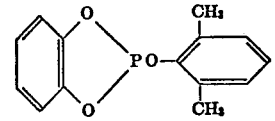

A 500 ml. flask was charged with 122.2 g. (1.0 mole) of 2,6-dimethylphenol. This was heated to 157° C. under $N_2$ and then 174.5 g. (1.0 mole) of 4,5-benzo-2-chloro-1,3,2-dioxaphospholane was added dropwise in 0.9 hour at 155–165° C. The mixture was heated an additional hour at 160° C., cooled under vacuum and distilled to give 247.5 g. (95% conversion) of clear, colorless product, B.P. 92–92° C., about 0.15 mm., having the following analysis:

*Analysis.*—Calc'd for $C_{14}H_{13}O_3P$ (percent): C, 64.6; H, 5.0; P, 11.9. Found (percent): C, 64.6; H, 5.0; P, 12.0.

EXAMPLE XVIII 2-(nonylphenoxy)-4,5-benzo-1,3,2-dioxaphospholane

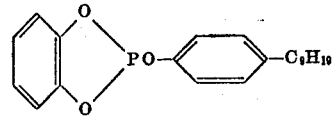

A 500 ml. flask was charged with 110.2 g. (0.5 mole) of nonylphenol. This was heated to 160° C. under $N_2$ and 87.3 g. (0.5 mole) of 4,5-benzo-2-chloro-1,3,2-dioxaphospholane was added dropwise in one hour at 160–170° C. The mixture was heated in this range an additional hour, cooled under vacuum, and distilled to give 4.0 g. of 4,5-benzo-2-chloro-1,3,2-dioxaphospholane (unreacted) and 152.6 g. (78% conversion) of clear, colorless liquid product, B.P. 152–153° C., about 0.15 mm.

EXAMPLE XIX 2-(2,4-di-t-butylphenoxy)-4,5-benzo-1,3,2-dioxaphospholane

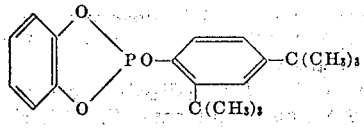

A 500 ml. flask was charged with 137.5 g. (0.67 mole) of 2,4-di-t-butylphenol. This was heated under $N_2$ to 160° C. and 116.4 g. (0.67 mole) of 4,5-benzo-2-chloro-1,3,2-dioxaphospholane was added dropwise in one hour at 155–162° C. After heating at 155–160° C. for 0.75 hour, the mixture was cooled under vacuum and distilled to give 199.1 g. (87% conversion) of clear, colorless product, B.P. 119–120° C., about 0.05 mm., having the following analysis:

*Analysis.*—Calc'd for $C_{20}H_{23}O_3P$ (percent): C, 69.7; H, 7.3; P, 9.00. Found (percent): C, 69.8; H, 7.4; P, 9.00.

It is to be understood that the specification, including the examples, are only illustrative of the invention claimed herein and that it is within the scope of this invention to employ equivalence obvious to one skilled in the art. Any limitations appearing in the preceding disclosure are not intended to limit this invention except insofar as the limitations are stated to be important or otherwise appear in the appended claim.

What is claimed:
1. A composition comprising (1) a compound selected from the group consisting of

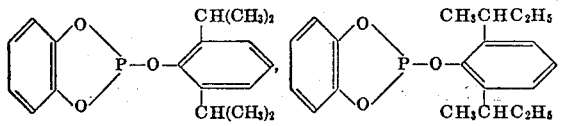

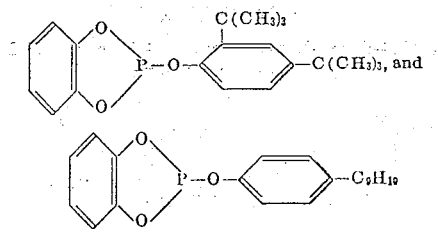

and (2) a polymer selected from the group consisting of polyethylene and polypropylene.

References Cited

UNITED STATES PATENTS

| | | | |
|---|---|---|---|
| 2,733,226 | 1/1956 | Hunter | 260—29.7 |
| 2,951,055 | 8/1960 | Luttinger | 260—45.7 |
| 3,039,993 | 6/1962 | Friedman | 260—45.8 |
| 3,047,608 | 7/1962 | Friedman et al. | 260—927 |
| 3,267,069 | 8/1966 | Cummings | 260—45.75 |
| 3,297,631 | 1/1967 | Bown et al. | 260—45.95 |
| 3,356,770 | 12/1967 | Larrison | 260—930 |
| 3,415,906 | 12/1968 | Shepard et al. | 260—937 |
| 3,472,813 | 10/1969 | Hecker et al. | 260—45.75 |

FOREIGN PATENTS

| | | | |
|---|---|---|---|
| 1,461,139 | 12/1966 | France | 260—937 |

DONALD E. CZAJA, Primary Examiner

R. A. WHITE, Assistant Examiner

U.S. Cl. X.R.

260—880 R